US 6,687,249 B1

(12) United States Patent
Noguera-Rodriguez et al.

(10) Patent No.: US 6,687,249 B1
(45) Date of Patent: Feb. 3, 2004

(54) RECONFIGURING DIVERSITY LEGS DURING CN-RNC INTERFACE STREAMLINING

(75) Inventors: Juan Noguera-Rodriguez, Tokyo (JP); Göran Rune, Linkoping (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 474 days.

(21) Appl. No.: 09/139,749

(22) Filed: Aug. 25, 1998

(51) Int. Cl.$^7$ ................................................ H04Q 1/00
(52) U.S. Cl. ........................ 370/395; 370/331; 455/442
(58) Field of Search ................................. 370/331, 334, 370/395; 375/267, 347; 455/442, 436, 439, 550, 272, 273

(56) References Cited

U.S. PATENT DOCUMENTS

| | | | | |
|---|---|---|---|---|
| 5,729,536 A | * | 3/1998 | Doshi et al. | 370/310.1 |
| 5,850,607 A | * | 12/1998 | Muszynski | 455/442 |
| 5,940,381 A | * | 8/1999 | Freeburg et al. | 370/310.1 |
| 5,978,365 A | * | 11/1999 | Yi | 455/442 |
| 5,991,273 A | * | 11/1999 | Abu-Dayya | 375/347 |
| 6,009,328 A | * | 12/1999 | Muszynski | 455/442 |

FOREIGN PATENT DOCUMENTS

| | | |
|---|---|---|
| DE | 195 47 467 C | 7/1997 |
| EP | 0 679 042 A | 10/1999 |
| WO | WO 95 08898 A | 3/1995 |

* cited by examiner

Primary Examiner—Brian Zimmerman

(57) ABSTRACT

In a mobile communications network that employs diversity combining/splitting, CN-RNC interface streamlining can be accomplished more efficiently by reconfiguring the network diversity legs, which are combined into a single data stream by the serving radio network controller, wherein the serving radio network controller is directly connected to the core network via the CN-RNC interface. Reconfiguration of the network diversity legs is accomplished by releasing the transport level connections which support the network diversity legs prior to CN-RNC interface streamlining, and establishing new transport level connections to support the reconfigured, network diversity legs subsequent to CN-RNC interface streamlining. To establish new transport level connections, the serving radio network controller dispatches binding information to each of the destination nodes associated with the network diversity legs. The destination nodes then utilize the binding information to bind network resources to the transport level connections which support the reconfigured network diversity legs between the destination nodes and the serving radio network controller.

7 Claims, 5 Drawing Sheets

US 6,687,249 B1

RECONFIGURING DIVERSITY LEGS DURING CN-RNC INTERFACE STREAMLINING

FIELD OF INVENTION

The present invention relates to the combining of radio signals in accordance with a technique known as diversity combining. More particularly, the present invention relates to the reconfiguration of diversity legs and the establishment of transport level connections, which support the diversity legs, during a change in the location of the diversity combining unit within the telecommunication network.

BACKGROUND

A typical mobile communications network, such as the mobile network 100 illustrated in FIG. 1, includes a number of elements. For instance, the mobile network 100 includes a core network CN, a radio access network RAN and multiple user equipment terminals (e.g., cellular telephones), such as mobile equipment terminal UE. The RAN, in turn, comprises a number of common elements or nodes. For example, the RAN illustrated in FIG. 1 comprises several base stations, BS1, BS2, BS3 and BS4, as well as several radio network controllers, SRNC, DRNC1 and DRNC2. Through the RAN, the user equipment terminal UE accesses services provided by the core network CN.

Generally, each base station BS1, BS2, BS3 and BS4 controls the radio connectivity in a corresponding geographic area known as a cell. Each RNC, in turn, controls the radio connectivity inside a given geographic area which covers one or more base stations. In FIG. 1, for example, the SRNC handles the geographic area that includes BS1, the DRNC1 handles the geographic area that includes BS2 and BS4, and DRNC2 handles the geographic area that includes BS3.

The RNCs serve in one of two capacities. First, an RNC can be a serving RNC (i.e., an SRNC). Second, a RNC can be a drift RNC (i.e., a DRNC). A SRNC provides the primary source of control over the connection between user equipment UE and the core network CN, wherein the SRNC communicates directly with the core network CN through the CN-RNC interface. In contrast, a DRNC, such as DRNC1 or DRNC2, supports the SRNC with radio resources for its connection with the user equipment UE. DRNCs communicate with the SRNC over an RNC-RNC interface. RNCs communicate with their corresponding base stations over an RNC-BS interface.

As will be explained in more detail below, the role of an RNC can change during the course of a UE connection (e.g., a telephone call). For example, as the UE travels from one cell to the next, a DRNC may be converted to a SRNC through a CN-RNC interface streamlining process, also known in the art as Iu streamlining. During CN-RNC interface streamlining, the CN-RNC interface which connects a SRNC to the core network is transferred from an original SRNC to a new SRNC.

In a mobile communications network, such as the mobile network 100 depicted in FIG. 1, radio signals are often impaired due to a variety of phenomena such as time dispersion, multipath fading and co-channel and/or adjacent channel interference. In order to mitigate signal impairment, a technique known as diversity combining/splitting herein referred to as diversity combining) is often employed. With diversity combining, a number of simultaneous radio and/or network connections, called diversity legs are established between the user equipment UE and two or more sectors of a single base station, two or more base stations and/or two or more RNCs. FIG. 2 illustrates a UE connection that presently has five radio diversity legs 1–5 and three network diversity legs A,B,C.

In accordance with diversity combining, diversity legs are combined at the various network nodes (i.e., the base stations and RNCs) until they are ultimately combined into a single data stream by the SRNC. By combining diversity legs, as described, any impairment affecting the radio signal associated with one diversity leg is typically compensated for by the radio signal associated with one or more of the other diversity legs.

In the RAN portion of the mobile communications network 100, which includes the connections between the base stations and the RNCs and between the RNCs, each network diversity leg is supported by a corresponding transport level connection at the RNC-RNC and/or RNC-BS interface. As one skilled in the art will readily appreciated, each network diversity leg represents a logical connection between two end points, for example, BS1 and the SRNC, whereas a corresponding transport level connection is a functional layer within a layered network architecture design that is responsible for conveying the signals associated with the network diversity leg.

As the user equipment UE moves about within the mobile communications network 100, the primary responsibility for controlling the connection between the user equipment UE and the core network CN may change. In fact, it may become necessary to relocate the diversity combining unit, herein referred to as the diversity handoff unit (DHO), from the present SRNC to a new SRNC. For example, in FIG. 1, if the user equipment UE travels from the cell associated with BS1 into the cell associated with BS2, such that a mobile assisted hand-off (MAHO) occurs between BS1 and BS2, the DHO for the connection may be relocated from the SRNC to the DRNC1. If the DHO unit is relocated, what was the SRNC will now be a DRNC, as shown in FIG. 3, and what was the DRNC1 will now be the SRNC. The process of relocating the DHO from the original SRNC to a new SRNC is called CN-RNC interface streamlining, as mentioned above. In order to properly relocate the DHO, an effective technique is required to reconfigure the various network diversity legs and to establish the transport level connections which are needed to support them.

SUMMARY OF THE INVENTION

The present invention involves a technique for effectively accomplishing CN-RNC interface streamlining in a mobile communications network, such as a cellular radio access network. The present invention accomplishes this, in part, by providing an efficient method for reconfiguring the various network diversity legs and for establishing the transport level connections which support them. Accordingly, it is an object of the present invention to provide a technique for relocating the diversity handover unit (DHO) from one radio network controller to another.

It is another object of the present invention to provide an efficient technique for reconfiguring the various network diversity legs, if necessary, during the relocation of a DHO in a radio telecommunications network that employs diversity combining.

It is still another object of the present invention to provide an efficient technique for releasing and reestablishing the transport level connections needed to support the reconfigured network diversity legs, during the relocation of a DHO.

In accordance with one aspect of the present invention, the above-identified and other objects are achieved by a method for reconfiguring network diversity legs during CN-RNC interface streamlining. The method involves transferring destination address and binding information from a first radio network controller to a second radio network controller. A number of transport level connections are then released, wherein each of the transport level connections were utilized to support a corresponding network diversity leg, and a new transport level connection between the second radio network controller and each of a plurality of destination nodes is established by dispatching a destination address and binding information from the second radio network controller to each of the destination nodes. One or more resources at each destination node are then bound to support a corresponding network diversity leg between each destination node and the second radio network controller, based on the binding information dispatched to each destination node.

In accordance with another aspect of the present invention, the above-identified and other objects are achieved by a method for reconfiguring network diversity legs during CN-RNC interface streamlining, wherein each network diversity leg is supported by a corresponding asynchronous transfer method (ATM) adaptation layer type 2 (AAL2) transport level connection. The method involves transferring destination address and binding information from an old serving radio network controller to a new serving radio network controller, and releasing a number of AAL2 transport level connections, wherein each of the released AAL2 transport level connections were used to support a network diversity leg between a destination node and a diversity handover unit in the old serving radio network controller. An AAL2 set-up message is then transported from the new serving radio network controller to each of a number of destination nodes, in accordance with an existing address associated with each of the destination nodes, wherein each AAL2 set-up message contains binding information pertaining to a corresponding destination node. At each destination node, the corresponding AAL2 connection is bound to one or more resources, based on the binding information corresponding to the destination node, wherein the one or more resources are used to support a corresponding network diversity leg between the destination node and the diversity handover unit in the new serving radio network controller.

BRIEF DESCRIPTION OF THE DRAWINGS

The objects and advantages of the invention will be understood by reading the following detailed description in conjunction with the drawings in which.

DETAILED DESCRIPTION OF THE INVENTION

Figure 1:
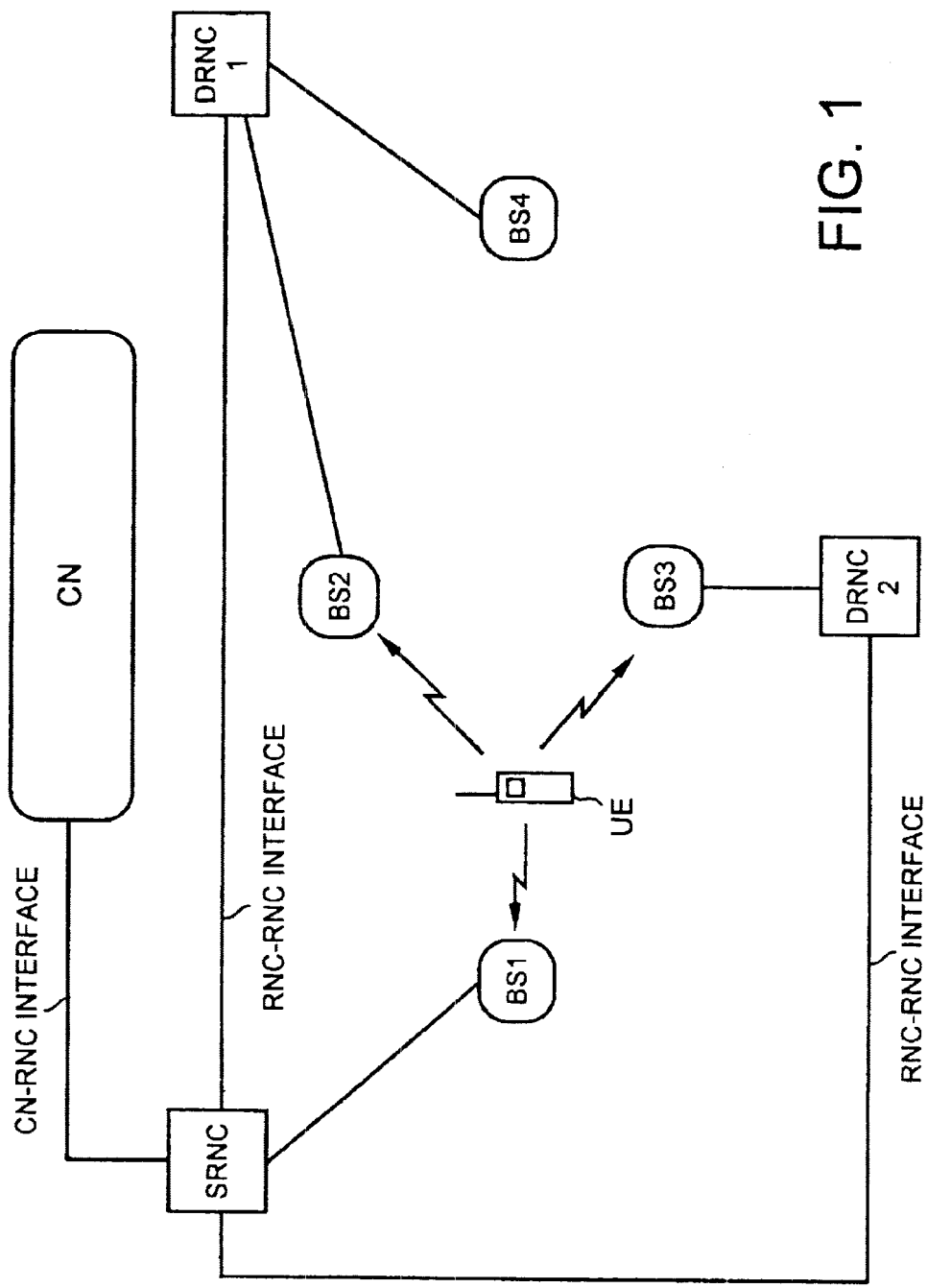
FIG. 1 illustrates a mobile communications network.

For a better understanding of the invention, the following detailed description refers to the accompanying drawings, wherein exemplary embodiments of the present invention are illustrated and described. In the figures, reference numbers and/or codes are used to identify key features of the invention. These reference numbers and/or codes appearing in the drawings are used consistently throughout the description.

The present invention involves a technique for accomplishing CN-RNC interface streamlining in a mobile communications network that employs diversity combining. More specifically, the present invention involves a technique for reconfiguring network diversity legs and for releasing and re-establishing the transport level connections which support the network diversity legs.

Figure 2:
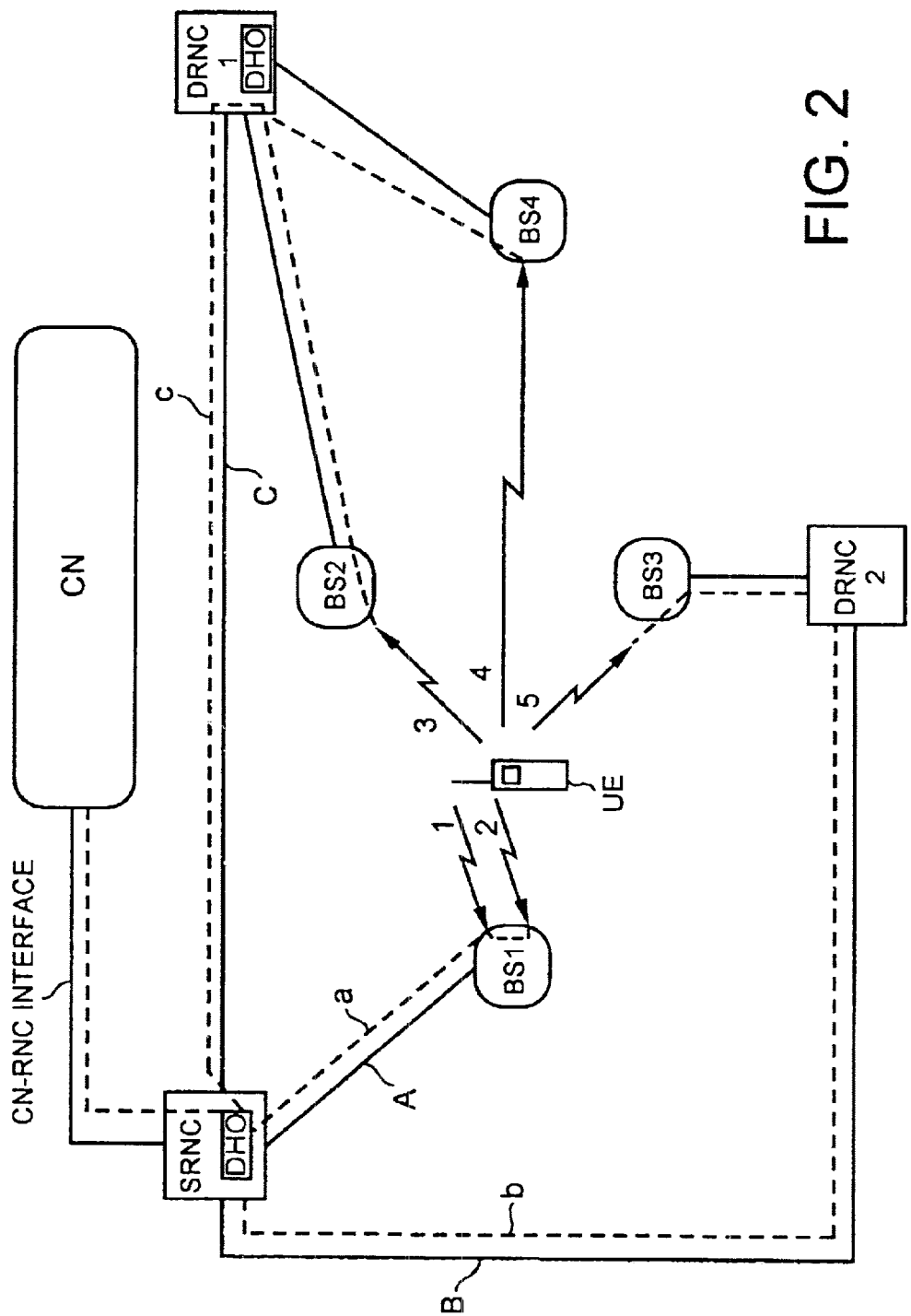
FIG. 2 illustrates a connection between user equipment and the core network, wherein the connection comprises a number of radio and network diversity legs.
Figure 3:
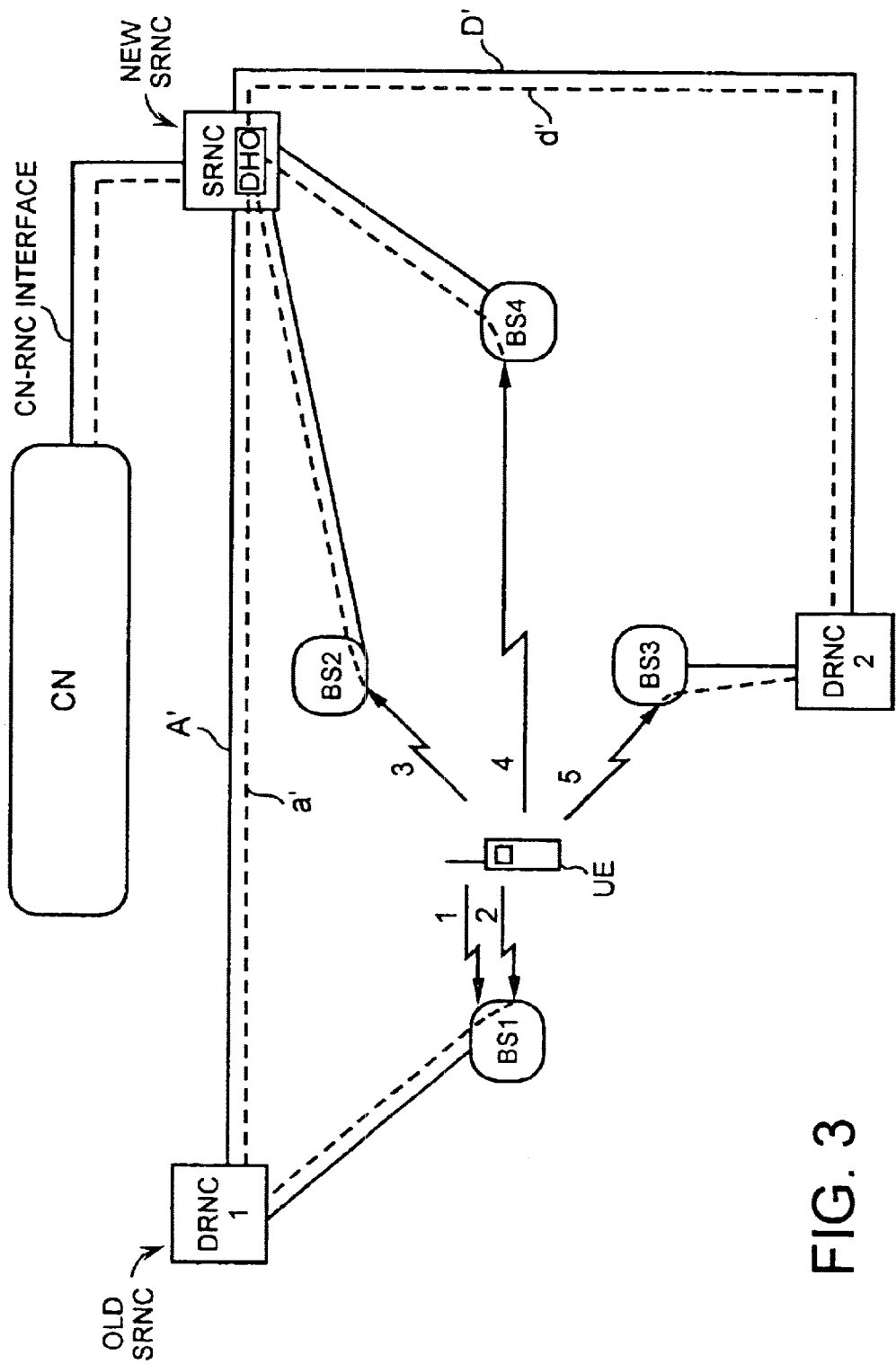
FIG. 3 illustrates the reconfiguration of network diversity legs during a CN-RNC interface streamlining process.

FIG. 3 illustrates the CN-RNC interface streamlining process, wherein primary responsibility for a connection between the core network CN and user equipment UE has been transferred from the SRNC in FIG. 2 (herein referred to as the old SRNC) to the DRNC1 in FIG. 2 (herein referred to as the new SRNC). Accordingly, the old SRNC in FIG. 2 is now identified as DRNC1 in FIG. 3, while the DRNC1 in FIG. 2 is now identified as the new SRNC in FIG. 3. As illustrated in FIG. 3, the configuration of the RAN within the mobile communications network has been altered by the CN-RNC interface streamlining process. First, the CN-RNC interface has been transferred from the old SRNC to the new SRNC. Second, the function provided by the diversity handover unit (DHO), also referred to as the combining unit, has been shifted from the old SRNC to the new SRNC. Third, the transport level connection "a" required to support network diversity leg A in FIG. 2 is released, and the transport level connections a' and d' are established to support newly reconfigured network diversity legs A' and D'.

In accordance with a preferred embodiment of the present invention, the new SRNC is responsible for reconfiguring the network diversity legs by re-establishing the transport level connections required to support them. The reason for this is the new SRNC, and more particularly, the DHO contained within the new SRNC is the one common endpoint (i.e., RAN node) for each of the network diversity legs. As such, the new SRNC, through the DHO, is capable of combining each of the network diversity legs into a single data stream for transport to the core network through the CN-RNC interface.

To reconfigure the network network diversity legs, the new SRNC requires certain information. That information includes, but is not necessarily limited to, what is herein referred to as the destination address and binding information associated with each network diversity leg. A destination address uniquely identifies a corresponding RAN node (e.g., a RNC or a base station) which is located at the opposite end of a network diversity leg from the DHO in the new SRNC. Hence, such nodes are also referred to as destination nodes. Binding information, however, uniquely identifies the physical resources that have been reserved to support a network diversity leg at the corresponding destination node.

Once the CN-RNC interface streamlining process has been initiated, the old SRNC conveys the destination address and binding information, required to reconfigure the network diversity legs, to the new SRNC. In a preferred embodiment, the destination address and binding information may be transferred from the old SRNC to the new SRNC as part of the CN-RNC interface streamlining signaling messages.

As stated, a destination address must uniquely identify a corresponding destination node. Thus, any network address associated with the destination node that satisfies this requirement may be utilized. However, as each of the network diversity legs is supported by a single, dedicated transport level connection, it is preferable that the transport level connection address associated with the destination node be utilized for this purpose. For example, if the transport level connections supporting the network diversity legs employ an asynchronous transfer mode (ATM) adaptation layer type 2 (AAL2) protocol, it is preferable that the AAL2 address associated with the destination node be used as the destination address.

If a new network diversity leg is established during a CN-RNC interface streamlining process, it may be necessary to establish binding information to identify the resources required to support the new network diversity leg. Furthermore, the binding information must be transferred to the two end-points (i.e., nodes) associated with the network diversity leg being established and the destination address must be transferred to the new SRNC. In a preferred embodiment, newly established binding information can be transferred via signaling messages which are ordinarily transported across the RNC-RNC and RNC-BS interfaces. If new binding information is to be established, it happens at the time the new network diversity leg is established.

As previously stated, binding information is unique with respect to each destination node. However, this is not true with respect to the SRNC. The reason for this is the SRNC is the node that controls the reconfiguration of the network diversity legs. Furthermore, the DHO within the SRNC is essentially the only resource that need be identified.

Figure 4:
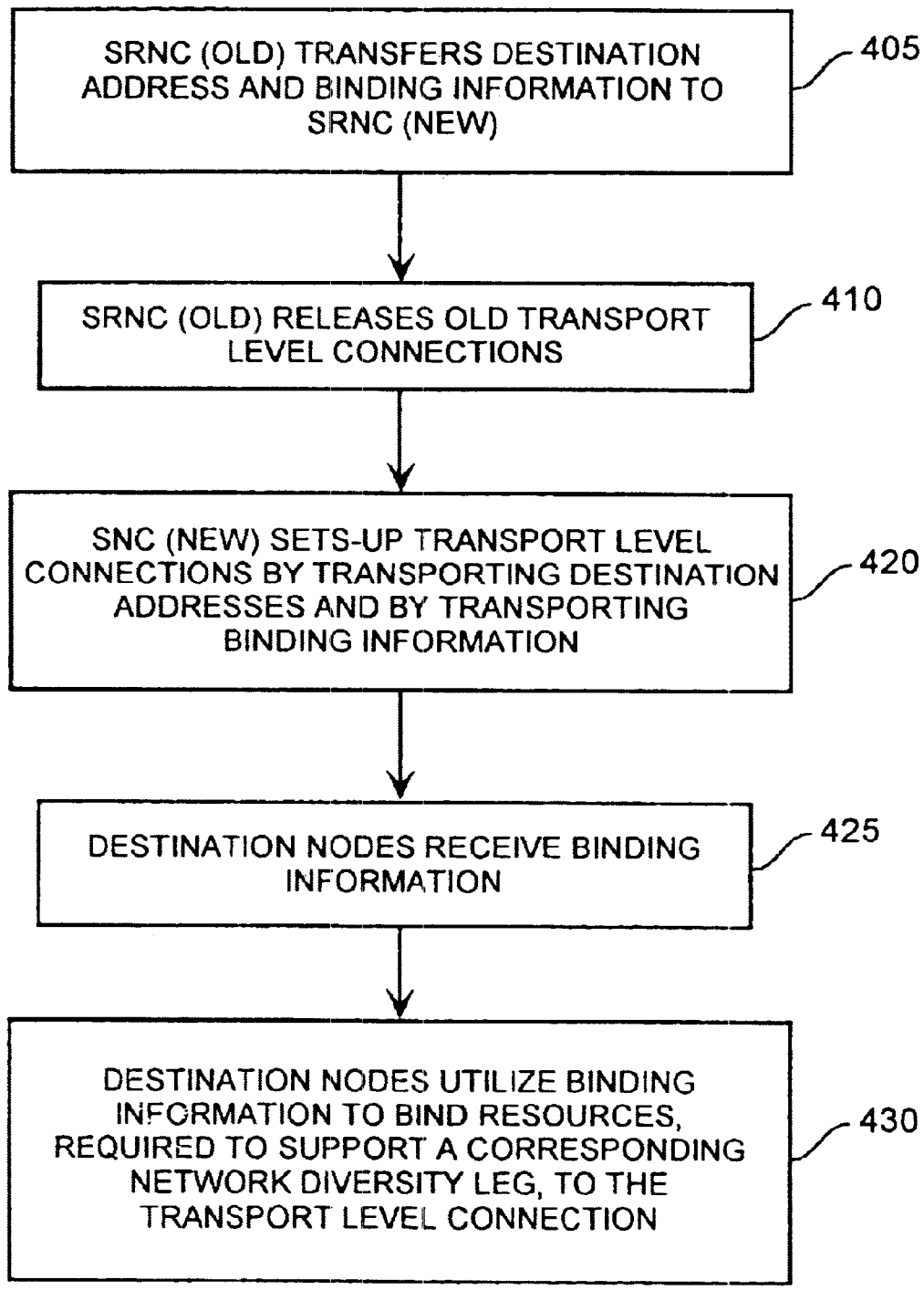
FIG. 4 is a flowchart depicting a technique for reconfiguring network diversity legs and reestablishing transport level connections in accordance with the present invention.

FIG. 4 illustrates an exemplary technique for accomplishing network diversity leg reconfiguration during CN-RNC interface streamlining. When the CN-RNC interface streamlining process is first initiated, as shown in step 405, the old SRNC transfers the destination address and binding information for each network diversity leg to the new SRNC. As stated above, in a preferred embodiment, the destination address and binding information are conveyed from the old SRNC to the new SRNC via CN-RNC interface streamlining signaling messages. In addition, the old SRNC releases the existing transport level connections, in accordance with step 410. It will be understood that steps 405 and 410 may be executed in any order.

Once the destination address and binding information have been conveyed to the new SRNC, the new SRNC can initiate the establishment of a new transport level connection, for each of the network diversity legs, by dispatching a transport level connection set-up message to each destination node. Contained in each transport level connection set-up message is the destination address of the corresponding destination node and binding information, as illustrated in step 420. Reconfiguration of the network diversity legs is complete once each destination node receives its set-up message and utilizes the binding information contained therein to bind the resources, represented by the binding information to the transport layer connection being set-up, as shown in steps 425 and 430.

Figure 5:
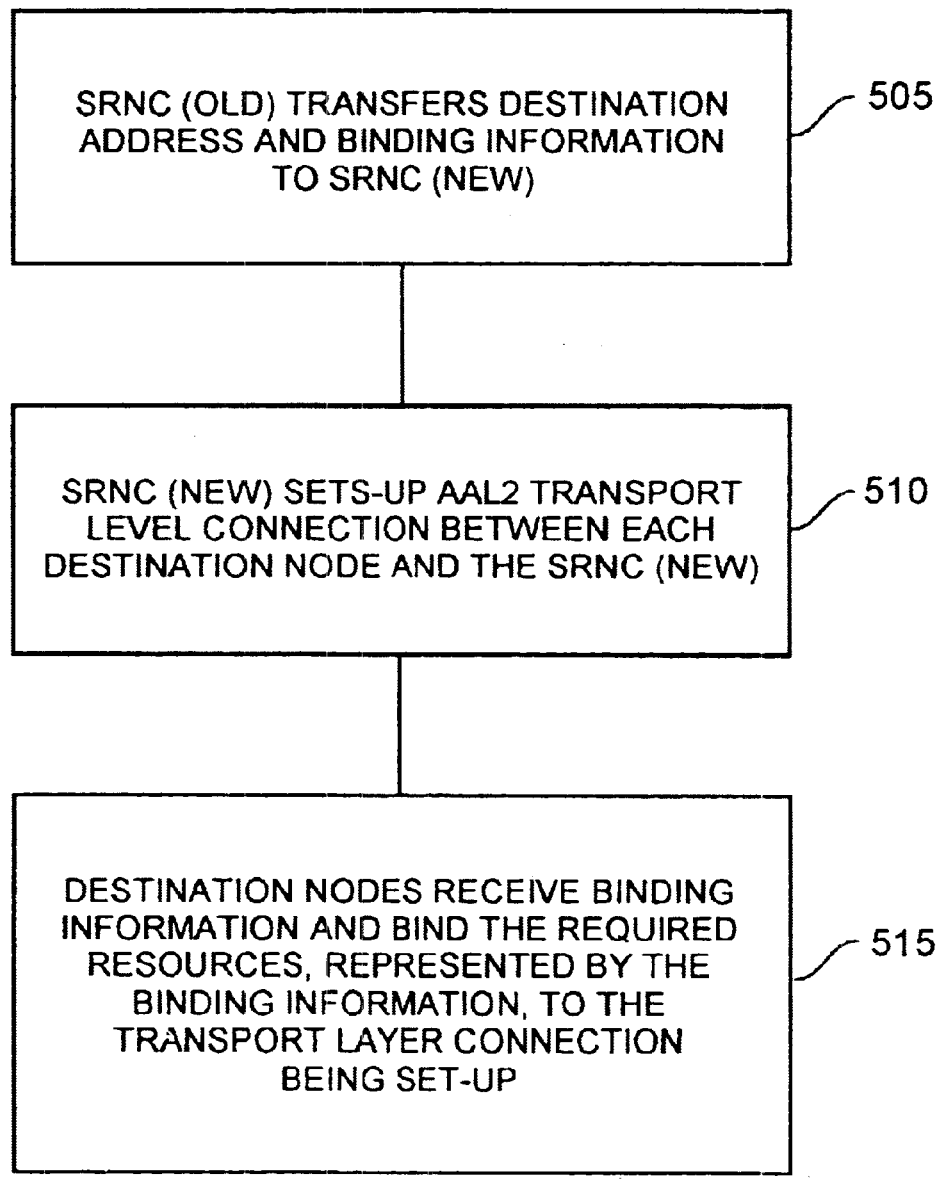
FIG. 5 is a flowchart depicting a technique for reconfiguring network diversity legs and reestablishing AAL2 transport level connections in accordance with the present invention.

In contrast, FIG. 5 illustrates an alternative technique for accomplishing network diversity leg reconfiguration during CN-RNC interface streamlining, wherein an AAL2 protocol is employed for the transport level connections. Similar to the technique illustrated in FIG. 4, this alternative technique begins with the transference of destination address information and binding information from the old SRNC to the new SRNC, as illustrated in step 505. The new SRNC then sets-up an AAL2 transport level connection between the DHO and each destination node by dispatching an AAL2 set-up message to each of the destination nodes, as shown in step 510. Upon receiving an AAL2 set-up message, each destination node extracts and utilizes the binding information to bind the resources, as represented by the binding information, to the AAL2 connection being set-up, as illustrated in step 515.

The present invention has been described with reference to several exemplary embodiments. However, it will be readily apparent to those skilled in the art that it is possible to embody the invention in specific forms other than as described above without departing from the spirit of the invention. The embodiments described above are illustrative and should not be considered restrictive in any way. The scope of the invention is given by the appended claims, rather than the preceding description, and all variations and equivalents which fall within the range of the claims are intended to be embraced therein.

What is claimed is:

1. In a radio access network that employs diversity combining, a method for reconfiguring diversity legs during CN-RNC interface streamlining comprising the steps of:

transferring destination address and binding information from a first radio network controller to a second radio network controller;

releasing a number of transport level connections, wherein each of the transport level connections were utilized to support a corresponding diversity leg;

establishing a new transport level connection between the second radio network controller and each of a plurality of destination nodes by dispatching a destination address and binding information from the second radio network controller to each of the destination nodes; and binding one or more resources at each destination node, based on the binding information dispatched to each destination node, to support a corresponding diversity leg between each destination node and the second radio network controller.

2. The method of claim 1, wherein the first radio network controller was a serving radio network controller prior to CN-RNC interface streamlining, and a drift radio network controller following CN-RNC interface streamlining, and wherein the second radio network controller was a drift radio network controller prior to CN-RNC interface streamlining, and a serving radio network controller following CN-RNC interface streamlining.

3. The method of claim 1, wherein said step of transferring destination address and binding information from the first radio network controller to the second radio network controller comprises the step of:

transmitting the destination address and binding information from the first radio network controller to the second radio network controller via CN-RNC interface streamlining signaling messages.

4. The method of claim 1, wherein the reconfigured diversity legs are network diversity legs.

5. In a radio access network that employs diversity combining, a method for reconfiguring diversity legs during CN-RNC interface streamlining, wherein each diversity leg is supported by a corresponding asynchronous transfer method (ATM) adaptation layer type 2 (AAL2) transport level connection, said method comprising the steps of:

transferring destination address and binding information from an old serving radio network controller to a new serving radio network controller;

releasing a number of AAL2 transport level connections, wherein each of the released AAL2 transport level connections were used to support a diversity leg between a destination node and a diversity handover unit in the old serving radio network controller;

transporting an AAL2 set-up message from the new serving radio network controller to each of a number of destination nodes, in accordance with an existing address associated with each of the destination nodes, wherein each AAL2 set-up message contains binding information pertaining to a corresponding destination node; and at each destination node, binding the corresponding AAL2 connection to one or more resources, based on the binding information corresponding to the destination node, wherein the one or more resources are used to support a corresponding diversity leg between the destination node and the new serving radio network controller.

6. The method of claim 5, wherein said step of transferring destination address and binding information from an old serving radio network controller to a new serving radio network controller comprises the step of:

transmitting the destination address and binding information in a CN-RNC interface streamlining signaling message.

7. The method of claim 5, wherein the diversity legs are main diversity legs, and wherein only main diversity legs are combined into a single data stream by the diversity handover unit in the new serving radio network controller and forwarded by the new serving radio network controller to a core network over a CN-RNC interface between the new serving radio network controller and the core network.

* * * * *